United States Patent
Petrini

(10) Patent No.: US 8,448,753 B2
(45) Date of Patent: May 28, 2013

(54) DISC BRAKE CALIPER WITH COOLING PIPES

(75) Inventor: Bruno Petrini, Castelvetro (IL)

(73) Assignee: Ferrari S.p.A. (IT)

( * ) Notice: Subject to any disclaimer, the term of this patent is extended or adjusted under 35 U.S.C. 154(b) by 420 days.

(21) Appl. No.: 12/663,133

(22) PCT Filed: Jun. 5, 2007

(86) PCT No.: PCT/IT2007/000393
§ 371 (c)(1),
(2), (4) Date: Jul. 26, 2010

(87) PCT Pub. No.: WO2008/149388
PCT Pub. Date: Dec. 11, 2008

(65) Prior Publication Data
US 2011/0048870 A1      Mar. 3, 2011

(51) Int. Cl.
*F16D 55/40*      (2006.01)
(52) U.S. Cl.
USPC .............. 188/71.6; 188/264 A; 188/264 AA
(58) Field of Classification Search
USPC .................. 188/264 A, 264 R, 264 AA, 71.6
See application file for complete search history.

(56) References Cited

U.S. PATENT DOCUMENTS

| | | | | |
|---|---|---|---|---|
| 3,664,467 A | * | 5/1972 | Lucien et al. ................ | 188/71.6 |
| 4,440,270 A | * | 4/1984 | Ross ...................... | 188/264 AA |
| 4,620,616 A | * | 11/1986 | Martin ..................... | 188/71.6 |
| 4,846,315 A | * | 7/1989 | Dayen ..................... | 188/264 A |
| 5,162,053 A | * | 11/1992 | Kowalski, Jr. .............. | 55/385.3 |
| 5,215,168 A | * | 6/1993 | Guiot et al. ................ | 188/71.6 |
| 5,558,183 A | * | 9/1996 | Way ....................... | 188/71.6 |
| 6,357,563 B1 | * | 3/2002 | Hayford et al. ............. | 188/264 A |
| 6,446,766 B1 | * | 9/2002 | Cornolti et al. ............. | 188/71.6 |
| 8,151,951 B2 | * | 4/2012 | Cornolti et al. .......... | 188/264 AA |

FOREIGN PATENT DOCUMENTS

| | | |
|---|---|---|
| EP | 1610027 | 12/2005 |
| WO | WO-2006035464 | 4/2006 |
| WO | WO-2008149388 | 12/2008 |

OTHER PUBLICATIONS

"International Application Serial No. PCT/IT/2007000393, Search Report dated Mar. 27, 2008", 3 pgs.
"International Application Serial No. PCT/IT/2007000393, Written Opinion dated Mar. 27, 2008", 6 pgs.

\* cited by examiner

*Primary Examiner* — Robert Siconolfi
*Assistant Examiner* — Thomas Irvin
(74) *Attorney, Agent, or Firm* — Schwegman Lundberg & Woessner, P.A.

(57) ABSTRACT

A disk brake caliper (4) which is provided with a disc (2) integral with a hub of a wheel and is rotatable about a central rotation axis (3); the caliper (4) presents: a hub-wheel supporting element (7a) and a wheel-side supporting element (7b), which are reciprocally counterposed on the opposite sides of the disc (2); at least one connection bridge (8) which straddles the disc (2) and forms a single part with the supporting elements (7) for rigidly connecting the two supporting elements (7) themselves together; a plurality of pistons (6), each of which is accommodated in a corresponding supporting element (7) and presses a pad (5) against a side surface of the disc (2); and a cooling circuit (9), which makes a flow of cooling air circulate through supporting elements (7) and comprises a plurality of cooking pipes (10) obtained through the supporting elements (7) themselves.

10 Claims, 3 Drawing Sheets

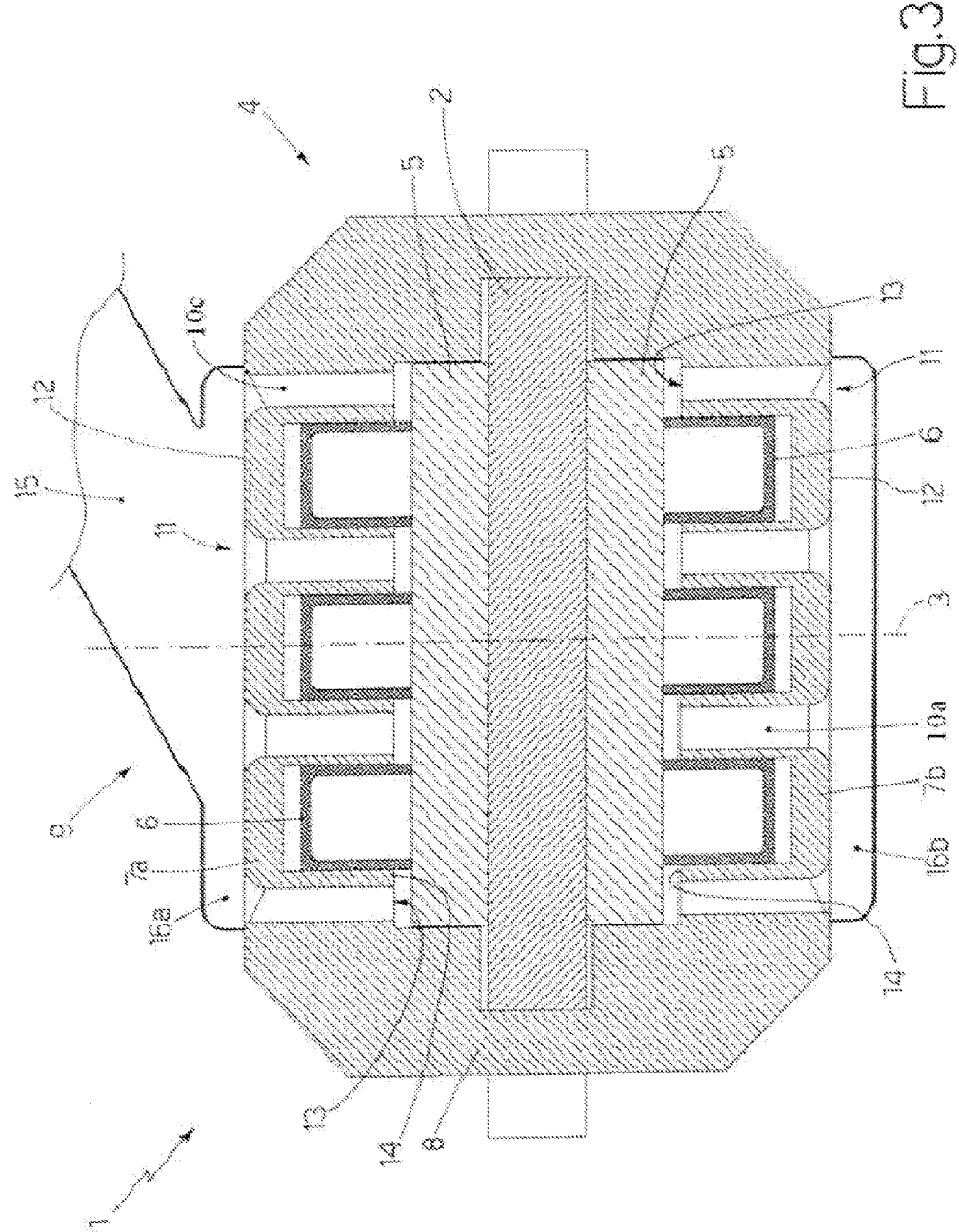

DISC BRAKE CALIPER WITH COOLING PIPES

RELATED APPLICATIONS

This application is a nationalization under 35 U.S.C. 371 of PCT/IT2007/000393, filed Jun. 5, 2007 and published as WO 2008/149388 A1 on Dec. 11, 2008; which application and publication are incorporated herein by reference and made a part hereof.

TECHNICAL FIELD

The present invention relates to a disc brake caliper.

PRIOR ART

A disc brake comprises a disc, which is integral with a rotatable part of a hub for fastening a vehicle wheel and is rotatable about a central rotation axis, and a caliper, which is integral with a hub holder, encompasses a portion of the disc and supports a plurality of counterpoised pistons adapted to press two counterpoised pads against the side surface of the disc. While braking, the pistons carried by the caliper press the counterpoised pads against the side surface of the disc so as to generate a friction force which dissipates the kinetic energy possessed by the vehicle, transforming it into heat that heats up the disc itself. The heat produced during braking is partially transmitted to the pistons which are in direct contact with the pads with a consequent heating of both the pistons themselves and the caliper which supports the pistons.

The pistons are hydraulically actuated by means of a pressurized brake control fluid which is pumped each time into an actuation chamber of the pistons; accordingly, it is necessary to avoid an excessive overheating of the pistons, because an excessive heating of the pistons also implies a similar excessive heating of the brake control fluid which would risk boiling considerably degrading its thrust ability. The problem of piston overheating (i.e. of the brake control fluid) is particularly felt in car races and above all in track car races, in which the brakes are continuously stressed with violent, prolonged braking.

Preferably, each piston has an active end, which is generally designated as radiator, which is in contact with the corresponding pad and is shaped so as to dispose of heat, in order to reduce the amount of heat which passes from the pads to the brake control fluid through the pistons. According to the known art, it is attempted to convey as much air as possible towards the piston radiating element, so as to form a barrier for the transfer of heat from the pads to the brake control fluid. The various means currently used for directing the air towards the radiators are structurally complex and hinder the handling of the pads and of the caliper at the end of the use of the car, e.g. at the end of a competition.

Patent application WO03058088A1 suggests a disc brake in which each piston internally presents a central cooling pipe through which a cooling air flow passes in use; specifically, inside each central cooling pipe, the cooling air circulates from the outside of the caliper inside the caliper by entering axially (i.e. parallelly to the rotation axis of the disc) and exits radially (i.e. perpendicularly to the rotation axis of the disc). However, this solution presents various drawbacks, because it implies an increased diameter of the pistons for creating the necessary space for the central cooling pipes (and thus an increase of the dimensions and weight of the caliper) and implies a greater constructive complexity of the pistons (specifically the use of a higher number of seals is needed for shielding the brake control fluid).

Patent application WO2006035464A1 suggests a disc brake in which there is provided a cooling circuit, which makes a cooling air flow circulate through the supporting elements of the caliper and comprises a plurality of cooling pipes obtained through the supporting elements themselves. Specifically, each cooling pipe presents an elbow shape, is arranged by the side of the pistons of the corresponding supporting element, and extends from the inlet mouth obtained in an upper wall of the corresponding supporting element to an outlet mouth obtained in a wall inside the corresponding supporting element. Such solution, however, despite being simple to manufacture does not ensure an optimal cooling.

DESCRIPTION OF THE INVENTION

One or more examples described here provide a brake disc caliper which is free from the above-described drawbacks and is at the same time easy and cost-effective to manufacture.

According to the present invention, a disc brake caliper is made as claimed in the accompanying claims.

BRIEF DESCRIPTION OF THE DRAWINGS

The present invention will now be described with reference to the accompanying drawings which illustrate a non-limitative example of embodiment thereof, in which:

FIG. 3 is a section view taken along line of the caliper in FIG. 1.

PREFERRED EMBODIMENTS OF THE INVENTION

Figure 1:
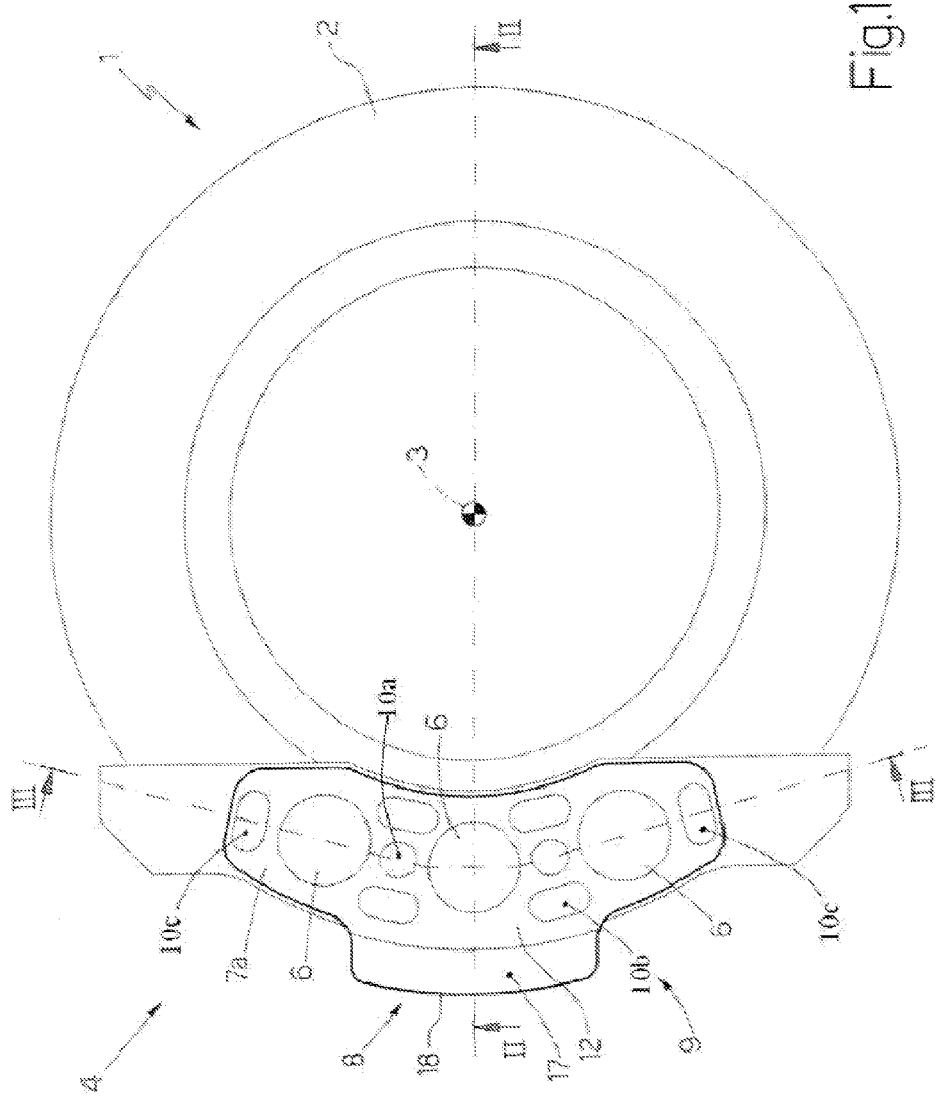
FIG. 1 is a diagrammatic front view of a brake disc provided with a caliper made according to the present invention.

In FIG. 1, numeral 1 indicates as a whole a disc brake comprising a disc 2, which is integral with a rotatable part of a hub (not shown) for fastening a wheel of a vehicle and is rotatable about a central rotation axis 3. Furthermore, disc brake 1 comprises a caliper 4, which is integral with a hub holder and is coupled to disc 2 itself so as to partially encompass disc 2 itself.

Two counterpoised pads 5 (shown in FIGS. 2 and 3) are mounted aboard caliper 4, the pads being adapted during braking to be pressed against a side surface of disc 2 by a plurality (six in the embodiment shown in the accompanying figures) of counterpoised pistons 6 supported by caliper 4. In certain examples, each piston 6 has an active end, which is generally designated as radiator, is in contact with corresponding pad 5 and is shaped so as to dispose of heat in order to reduce the amount of heat which passes from pads 6 to the brake control fluid through pistons 6. By way of example, the active end or radiator of each piston 6 is provided with openings, in the shape of circular holes.

Caliper 4 comprises a hub-side supporting element 7a and a wheel-side supporting element 7b, which are reciprocally counterpoised on the opposite sides of disc 2 and each of which supports three pistons 6; furthermore, caliper 4 comprises at least one connection bridge 8 which straddles disc 2 and forms an integral part with supporting elements 7 for rigidly connecting together the two supporting elements 7 themselves. According to an embodiment, caliper 4 is formed by a integral part, made of aluminum alloy with high mechanical features, for machine tool processing, from a semi-finished forging stock, e.g. a sheet, i.e. as from a part obtained by die-casting.

Furthermore, caliper 4 comprises a cooling circuit 9, which makes a flow of cooling air circulate through supporting elements 7 and towards pads 5 and comprises a plurality of cooling pipes 10 obtained through supporting elements 7 themselves. As shown in FIG. 3, each cooling pipe 10 is rectilinear, parallel to central rotation axis 3 of disc 2, is arranged by the side of pistons 6 of corresponding supporting element 7, and extends from an inlet mouth 11 obtained in an external wall 12 (i.e. opposite to disc 2) of corresponding supporting element 7 to an outlet mouth 13 obtained in an internal wall 14 (i.e. facing disc 2) corresponding supporting element 7.

Figure 2:
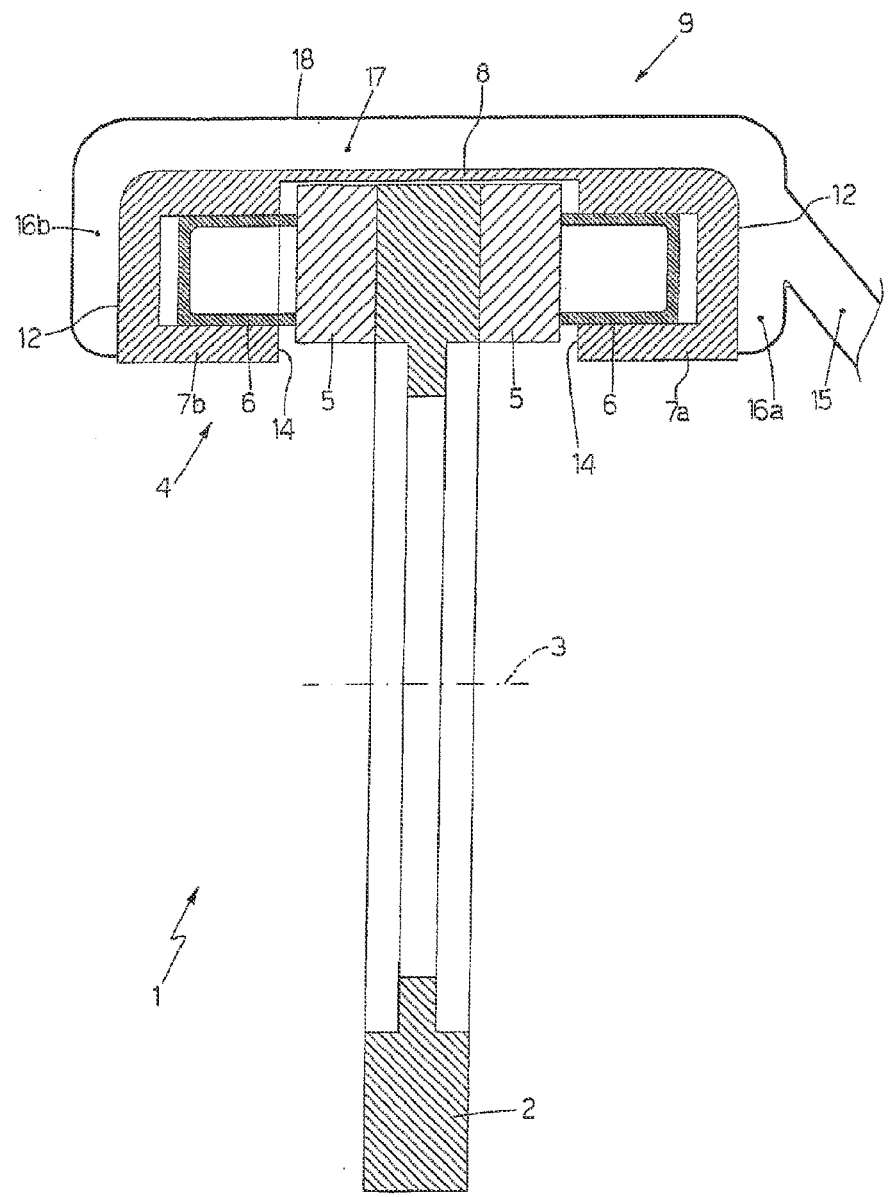
FIG. 2 is a section view taken along line II-II of the caliper in FIG. 1.

As shown in FIGS. 2 and 3, cooling circuit 9 comprises an air vent 15, which is arranged at hub-side supporting element 7a and presents an inlet mouth (not shown) arranged frontally to the vehicle to dynamically convey the air inside air vent 15 itself during vehicle advancement. Furthermore, cooling circuit 9 comprises a hub-side diffuser 16a which covers external wall 12 of hub-side supporting element 7a, receives the cooling air from air vent 15 and conveys the cooling air to cooling pipes 10 of hub-side supporting element 7a, and a wheel-side diffuser 16b which covers external wall 12 of wheel-side supporting element 7b, receives the cooling air from air vent 15 and conveys the cooling air to cooling pipes 10 of wheel-side supporting element 7b. Finally, cooling circuit 9 comprises at least one connection pipe 17 which connects wheel-side diffuser 16b to air vent 15 and preferably extends across connection bridge 8; in other words, wheel-side diffuser 16a receives the cooling air directly from air vent 15 which is arranged on the same side as hub-side diffuser 16a, while wheel-side diffuser 16b receives the cooling air from air vent 15 through connection pipe 17.

According to an embodiment shown in the accompanying figures, connection pipe 17 connects the two diffusers 16 and air vent 15 together and leads to hub-side diffuser 16a; in other words, air vent 15 feeds all the cooling air into hub-side diffuser 16a, which addresses part of the cooling air received from air vent 15 to wheel-side diffuser 16b through connection pipe 17.

In various examples, each diffuser 16 is shaped as a half-shell and is arranged in position set against external wall 12 of corresponding supporting element 7; instead, connection pipe 17 consists of a channel obtained in connection bridge 8 on the bottom and of a covering lid 18 of the channel mounted over connection bridge 8 on the top. According to a preferred embodiment, covering lid 18 and two diffusers 16 are reciprocally monolithic and form a single, indivisible part.

As shown in FIG. 1, each supporting element 7 accommodates three pistons 6 and presents eight cooling pipes 10, which are uniformly distributed about the three pistons 6; specifically, each supporting element 7 presents six central cooling pipes 10a and 10b arranged in threes between central piston 6 ad side pistons 6 and two side cooling pipes 10c arranged externally and by the side of side pistons 6. In this case, each side cooling pipe 10c presents an elongated section while between two pistons 6 a central cooling pipe 10a presents a circular section and two central cooling pipes 10b present an elongated section.

According to different embodiments (not shown), cooling circuit 9 may present four cooling pipes 10 uniformly distributed between the three pistons 6 for each supporting element 7, or cooling circuit 9 may present six cooling pipes 10 (two side cooling pipes 10 arranged externally and by the side of side pistons 6 and four central cooling pipes 10 arranged in twos between a central piston 6 and side pistons 6).

In use, the cooling air is fed from air vent 15 directly to hub-side diffuser 16a and through connection pipe 17 to wheel-side diffuser 16b. From diffusers 16, the cooling air is distributed to the various cooling pipes 10 so that each cooling pipe 10 is concerned by an air flow which flows from inlet mouth 11 at external wall 12 of corresponding supporting element 7 to outlet mouth 13 of internal wall 14 of corresponding supporting element 7. Through cooling pipes 10 obtained inside supporting elements 7, the cooling air subtracts heat from supporting elements 7 and thus from pistons 6 which are accommodated within supporting elements 7. Furthermore, exiting from outlet mouth 13 of each cooling pipe 10, the cooling air invests the active ends or radiators of pistons 6 arranged by the side of cooling pipe 10 favoring the cooling of the active ends or radiators of pistons 6 and thus reducing the transfer of heat from pads 5 to pistons 6 (and thus to the brake control fluid). In virtue of the fact that outlet mouths 13 of cooling pipes 10 reach very near the active ends or radiators of pistons 6, which they face in very close relationship, the efficacy of the cooling is high.

According to a possible embodiment (not shown), cooling channels 10 are not perfectly axial (i.e. not perfectly perpendicular to disc 2), but are slightly inclined to converge towards active ends or radiators of corresponding pistons 6. In this manner, the cooling air which is released from outlet mouth 13 of a cooling channel 10 completely or nearly completely invests a corresponding piston 6. Alternatively, only outlet mouth of cooling channels 10 could be shaped so as to converge towards active ends or radiators of corresponding pistons 6.

The above-described caliper 4 presents a number of advantages, because it is simple to manufacture, particularly resistant and light, and does not require any change to the dimension and/or the configuration of pistons 6. Furthermore, cooling circuit 9 of caliper 4 is particularly effective and efficient; some simulations have highlighted that, inlet air flow being equal, cooling circuit 9 of above-described caliper 4 presents a superior cooling efficiency with respect to the cooling circuit described in patent application WO2006035464A1. Such a result is obtained in virtue of the fact that cooling pipes 10 are rectilinear and extend from external wall 12 of corresponding supporting element 7 to internal wall 14 of corresponding supporting element 7; indeed, in virtue of the particular conformation of cooling pipes 10, the load losses induced by cooling pipes 10 are minimized and thus, the inlet cooling air flow being equal, the active cooling air flow rate which flows through cooling pipes 10 increases.

The invention claimed is:

1. A disc brake caliper which is provided with a disc integral with a hub of a wheel, the disc rotatable about a central rotation axis, the caliper comprising:
a hub-side supporting element and a wheel-side supporting element, which are counterpoised on opposite sides of the disc;
at least one connection bridge which straddles the disc and forms a single part with the supporting elements for rigidly connecting the two supporting elements together;
a plurality of pistons, each of which is arranged in a corresponding supporting element and presses a corresponding pad against a side surface of the disc; and
a cooling circuit, which makes a flow of cooling air circulate through said supporting elements and comprises a plurality of cooling pipes, which are obtained through the supporting elements and are arranged by the side of the pistons, wherein each cooling pipe is rectilinear and extends from an inlet mouth obtained in an external wall of the corresponding supporting element opposite to the disc to an outlet mouth obtained in an internal wall inside the corresponding supporting element facing the disc, wherein the cooling circuit comprises: an air vent arranged at said hub-side supporting element; a hub-side diffuser which covers the external wall of hub-side supporting element and receives the cooling air from the air vent; a wheel-side diffuser which covers the external wall of wheel-side supporting element and receives the cooling air from the air vent; and at least one connection pipe for connecting the wheel-side diffuser to the air vent;

wherein each supporting element accommodates three pistons and presents eight cooling pipes, which are uniformly distributed about the three pistons so that each cooling pipe is independent and separate from the other cooling pipes;

wherein each supporting element presents two elongated cross-section side cooling pipes arranged externally and by the side of said pistons and six central cooling pipes arranged in threes between the central piston and the side pistons;

wherein each supporting element presents, between the central piston and each side piston, a circular cross-section central cooling pipe and two elongated cross-section central cooling pipes that are arranged on opposite sides of the circular cross-section central cooling pipe; and wherein at least one cooling pipe in each supporting element is shaped to converge towards an end of at least one corresponding piston.

2. A caliper according to claim 1, wherein the connection pipe connects the two diffusers.

3. A caliper according to claim 2, wherein the air vent leads into the hub-side diffuser.

4. A caliper according to claim 1, wherein each diffuser is arranged in position set against the external wall of the corresponding supporting element.

5. A caliper according to claim 1, wherein the connection pipe extends across the connection bridge.

6. A caliper according to claim 5, wherein the connection pipe consists of the connection bridge on the bottom and of a covering lid mounted over the connection bridge on the top.

7. A caliper according to claim 6, wherein the covering lid and the two diffusers are monolithic and form a single, inseparable part.

8. A caliper according to claim 1, wherein the connection pipe and the two diffusers are monolithic and form a single, undividable part.

9. A caliper according to claim 1, wherein at least one cooling pipe is parallel to the central rotation axis of the disc.

10. A caliper according to claim 1, wherein the entire cooling pipe converges towards an end of at least one corresponding piston.

\* \* \* \* \*

UNITED STATES PATENT AND TRADEMARK OFFICE
CERTIFICATE OF CORRECTION

| | | |
|---|---|---|
| PATENT NO. | : 8,448,753 B2 | Page 1 of 1 |
| APPLICATION NO. | : 12/663133 | |
| DATED | : May 28, 2013 | |
| INVENTOR(S) | : Bruno Petrini | |

It is certified that error appears in the above-identified patent and that said Letters Patent is hereby corrected as shown below:

On the Title Page

Item (75), in "Inventor", in column 1, line 1, delete "IL" and insert --IT--, therefor Item (57), in "Abstract", in column 2, line 14, delete "cooking" and insert --cooling--, therefor Signed and Sealed this
Eleventh Day of November, 2014

Michelle K. Lee
*Deputy Director of the United States Patent and Trademark Office*